(12) United States Patent
Dukes et al.

(10) Patent No.: US 6,978,794 B2
(45) Date of Patent: Dec. 27, 2005

(54) AUTOMATIC CONTROL METHOD AND SYSTEM FOR IRRIGATION

(75) Inventors: Michael D. Dukes, Gainesville, FL (US); Luis Carlos Nogueira, Colatina (BR); Camilo Cornejo, Gainesville, FL (US); Larry Wayne Miller, Hawthorne, FL (US); Dorota Zofia Haman, Gainesville, FL (US); Johan M. Scholberg, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 129 days.

(21) Appl. No.: 10/443,401

(22) Filed: May 22, 2003

(65) Prior Publication Data

US 2003/0230638 A1 Dec. 18, 2003

Related U.S. Application Data

(60) Provisional application No. 60/382,323, filed on May 22, 2002.

(51) Int. Cl.$^7$ ............... F16K 17/36; A01G 27/00
(52) U.S. Cl. ............... 137/1; 137/78.3; 239/64; 239/69
(58) Field of Search ............... 239/69, 70, 63, 239/64; 137/78.3, 1

(56) References Cited

U.S. PATENT DOCUMENTS

| | | | |
|---|---|---|---|
| 4,918,375 A | 4/1990 | Malicki et al. |
| 5,546,974 A | 8/1996 | Bireley |
| 5,570,030 A | 10/1996 | Wightman |
| 5,651,500 A | 7/1997 | Patterson et al. |
| 5,740,038 A | 4/1998 | Hergert |
| 5,749,521 A | 5/1998 | Lattery |
| 5,847,568 A | 12/1998 | Stashkiw et al. |
| 5,908,045 A | 6/1999 | Wallace et al. |
| 5,927,603 A | 7/1999 | McNabb |
| 5,938,372 A | 8/1999 | Lichfield |
| 6,076,740 A | 6/2000 | Townsend |
| 6,079,433 A | 6/2000 | Saarem |
| 6,314,340 B1 | 11/2001 | Mecham et al. |
| 6,532,803 B2 | 3/2003 | Hutchinson et al. |

OTHER PUBLICATIONS

Marouelli, W.A.; Silva, W.L.C.; Silva, H.R. 1996. Manejo da irrigacao em Hortalicas. Embrapa–CNPH, 5.ed., ver. ampl., Brasilia: Embrapa–SPI, 72p.

C.F. Souza, E.E. Matsura, R. Testezlaf, Determination of the Wetting Front In Drip Irrigation Using TDR Multi–Wire Probe, TDR 2001: The Second Interational Symposium and Workshop on Time Domain Reflectometry for Innovative Geotechnical Applications, Aug. 2001, pp. 72–81, United States.

C.F. Souza, E.E. Matsura, R. Testezlaf, Application of the TDR Technique in Tropical Soil, TDR 2001: The Second International Symposium and Workshop on Time Reflectometry for Innovative Geotechnical Applications, Aug. 2001, pp. 273–280, United States.

(Continued)

*Primary Examiner*—A. Michael Chambers
(74) *Attorney, Agent, or Firm*—Akerman Senterfitt

(57) ABSTRACT

A controlled irrigation system can include a control device for determining whether to irrigate soil and at least one irrigation structure having an actuator for controlling water flow. The actuator can be communicably coupled to the control device for delivering water to irrigate a region. The controlled irrigation system further can include at least one time domain reflectometry sensor ("TDRS") located in the soil and communicably coupled to the control device for measuring soil moisture where the control device determines whether to irrigate the soil based on data from the at least one TDRS. Additionally, a method for controlling an irrigation system can include providing multiple TDRS's having probes, distributing each TDRS at a different soil depth, measuring soil moisture content, and irrigating soil based on the measuring step.

20 Claims, 3 Drawing Sheets

OTHER PUBLICATIONS

Moffitt, L.R. Time Domain Reflectometry: Theory and Applications, Engineering Design News, Nov., 1964, pp. 38–44.

Laboski et al., Abstract, "Irrigation Scheduling for a Sandy Soil Using Mobile Frequencey Domain Reflectometry with a Checkbook Method," Soil and Water Conservation Society 2001.

Andrews, J.R. 1994. Time Domain Reflectometry. In: Symposium and Workshop on Time Domain Reflectometry in Environmental, Infrastructure, and Mining Applications Held at Northwestern University, Evanston, Illinois, 1994 (Washington, DC: U.S. Bureau of Mines), pp. 4–13. USBM special publication SP 19–94.

Assaf, R; Levin, I; Bravdo, B. 1989. A Optimization of Water for Fruit Trees by a Computerized Irrigation System. Agronomie, n.9. p. 451–456.

Baker, J.M.; Allmaras, R.R. 1990. System for Automation and Multiplexing Soil Moisture Measurement by Time–Domain Reflectometry. Soil Science Society of America Journal, v.54, n.1,. p. 1–6.

Campbell, G. and R. Anderson, "Evaluation of Simple Transmission Line Oscillators for Soil Moisture Measurement," Computers and Electronics in Agricultures, 20:31–44, 1998.

Deho, A. 1991. Controladores Programavels—tecnologia electronica que comanda a distancia o manejo da irrigacao localizada. Irrigacao e Technologia Moderna, v.44, p. 9–13.

Espinosa, A., Aguilar, J. 1996. The Conformation of Data Transmission Network of Electronic Flow Meters Inside an Irrigation District. In: International Conference on Computers in Agriculture, 6, Cancun, Proceedings . . . ASAE.

Grosch, R.J. 1987, Instrumentation for Automated Irrigation Systems. In: Automated Irrigation Systems: Irrigation Water Delivery System. p. 300–310.

Harrison, D.S., A.G. Smajstria, R.E. Choate, and G.W. Isaacs. 1983. Irrigation in Florida Agriculture in 80's. Ext. Bul. 196. Fla. Coop. Ext. Serv., Univ. of Florida., Gainesville, FL.

Huang et al., 2000. Telemetric and Multiplexing Enhancement of Time Domain Reflectometry Measurements. Department of Civil Engineering, Northwestern University Evanston, IL. 13p.

Kalkman, C.J. 1995. LabVIEW: a Software System for Data Acquistion, Data Analysis, and Instrument Control. Journal of Clinical Monitoring. v.11, i.1, p. 51–58.

Lopez, J.R.; Abreau, J.M.H.; Regalado, A.P.; Hernandez, J.F.G. 1992. Riego Localizado. Ediciones Mundi–Prensa/MAPA–IRYDA. Madrid, 405p.

Mantovani, E.C.; Costa, L.C.; Leal, B.G. 1997. SISDA. Sistema de Suporte a Decisao Agricola. In: Encontro das Aguas. Fortaleza, SRH–MMA.

Marouelli, W.A.; Silva, W.L.C.:; Silva, H.R. 1996, Manejo da irrigacao em Hortalicas. Embrapa–CNPH, 5.ed., ver. ampl., Brasilia: Embrapa–SPI, 72p.

Martinez, R.; Arteaga, R.; Sanchez, R. 1996. A Computer Program for Irrigation Scheduling. In: International Conference in Agriculture, 6, Cancun, Proceedings . . . ASAE.

Mohanty, B.P.; Shouse, P.J.; Van Genuchten, M.T. 1998. Spatio–temporal dynamics of Water and Heat in a Field Soil and Tillage Research, vol. 47, Issues 1–2, pp. 133–143.

Morais et al., 1998. Microcontrollers Developments and Its Application to Agriculture: A Greenhouse Control System. In: International Conference On Computers in Agriculture, 7, Orlando, Florida. Proceedings . . . ASAE.

Noborio, K. 2001. Measurement of Soil Water Content and Electrical Conductivity by Time Domain Reflectometry: a Review. Computers and Electronics in Agriculture, 31:213–237.

Phene, C.J. 1989. Technics for Computerized Irrigation Management. Computers and Electronics in Agriculture. v.3, p. 189–200.

Pizarro, F. 1987. Riegos localizados de alta frecuencia. Ediclones Mundi_Pensa. Madrid, 461p.

Roy, K.C. 1998. Irrigation Scheduling of Wheat Using a Computer Program—A Case Study in Bangladesh. In: International Conference on Computers in Agriculture, 7, Orlando, Florida. Proceedings . . . ASAE.

Sadler, E.J., C.R. Camp. D.E. Evans, and L.J. Usrey. 1996. A Site–Specific Center Pivot Irrigation System for Highly–Variable Coastal Plain Soils. In Precision Agriculture: Mar. 23–26, 1996. ASA/CSSA/SSSA, Madison, WI. (1) p. 827–834.

Silva, E.M.: Pinto, A.C.Q.; Azevedo, J.A. 1996. Manejo da Irrigacao e fertirrigacao na cultura da mangueira. Planaltine: Embrapa–CPAC, 77p. (Embrape–CPAC. Documentos, 61).

Smajstria, A.G. and D.Z. Haman. 1999. Irrigated Acreage in Florida: A Summary through 1998. CIR 1220, Fla. Coop. Ext. Serv., Univ. of Fla., Gainesville, FL.

Souza, V.F.; Agular Netto, A.O.; Andrade Junior, A.S.; Bastos, E.A.; Souza, A.P.; Dantas Neto. J. 1997. Manejo de Irrigacao etraves do balanco de agua no solo. Teresina: Embrape–CPAMN. 36p. (Embrape–CPAMN. Documentos, 23).

SRPRT. 2000. Instrumentation. Smart Road Pavement Research Team Center for Transportation Research. Blacksburg, Virginia. 12p.

Testezief, R; Zazueta, A.S.; Yeager, T.H. 1996. A Real–Time Irrigation Control System for Greenhouses. In: International Conference and Computers in Agriculture, 6, Cancun, Proceedings . . . ASAE.

Thomson, S.J.; Threadgill, E.D. 1987. Microcomputer Control for Soil Moisture–Based Scheduling Center Pivot Irrigation Systems. Computers and Electronics in Agriculture, v.1., p. 321–338.

Topp, G.C.; Davis, J.L.; Annan, A.P. 1980. Electromagnetic Determination of Soil Water Content. Water Resource Res., 16:576.582.

Wang, D.; Shannon, M.C.; Grieve, C.M. and Yates, S.R. 2000, Soil Water and Temperature Regimes in Drip and Sprinkler Irrigation, and Implications to Soybean Emergence, Agriculture Water Management, vol. 43, Issue 1, pp. 15–28.

Zazueta, F.S.; Smajstria, A.G. 1997. Computer Control of Irrigation Systems. Agricultural Engineering Department. University of Florida. p. 518–522.

Zazueta, F.S.; Smajstria, A.G.; Harrison, D.S. 1984. Computer Management of Trickle Irrigation Systems. Proc. Fla. State Hort. Soc., v.97, p. 1–3.

AUTOMATIC CONTROL METHOD AND SYSTEM FOR IRRIGATION

CROSS REFERENCE TO RELATED APPLICATIONS

This application claims priority to Provisional Patent Application Ser. No. 60/382,323 filed in the U.S. Patent and Trademark Office on May 22, 2002.

BACKGROUND OF THE INVENTION

1. Technical Field

The present invention relates to irrigation systems and, more particularly, to controlled irrigation systems.

2. Description of the Related Art

On a global level, the concern over efficient usage of fresh water increases daily. This concern is fueled by frequent uncontrolled use of available water, which can lead to depletion and pollution of existing water reservoirs. Further exacerbating these concerns is the fact that in many regions of the world, the availability of ground water is limited.

Irrigation technology seeks to provide sufficient water resources for efficient agricultural production at high volumes. In other words, irrigation technology attempts to supply the amount of water needed for optimum crop development and production using various water management techniques involving timing of water application and measure of water usage. For example, a measure of water content within soil as determined through analysis of irrigation frequency can be used to determine when water should be applied to a given crop. Another such measure can include the analysis of symptoms of water deficiency, for instance as may be exhibited in plant life. Nevertheless, due to the high cost of installation and maintenance of water measurement and irrigation systems, suitable irrigation systems frequently go unused.

Considering only the logistics and management of water, it is possible to significantly increase the efficiency of irrigation systems through automation, thereby reducing water usage. Increases in irrigation efficiency and reduction of water usage can be particularly important for regions with adverse climate conditions. For example, in some regions rainfall is not uniform with respect to both the months in which the rainfall occurs and the distribution of the rainfall throughout the region. The efficient usage of water resources can alleviate some of these problems.

While some regions experience periods of high rainfall, the amount of rainfall, and therefore fresh water received by a region, remains an important issue, especially in light of demands placed upon water supplies by large populations, high evapotranspiration, and the loss of water through sandy soils with low water holding capacity. Urban, environmental, and recreational uses of water also compete with agricultural water usage as each seeks access to large, but limited supplies of fresh water.

SUMMARY OF THE INVENTION

The invention disclosed herein provides a controlled irrigation system including a control device for determining whether to irrigate soil and at least one irrigation structure having an actuator for controlling water flow where the actuator is communicably coupled to the control device for delivering water to irrigate a region. The controlled irrigation system also includes at least one time domain reflectometry sensor ("TDRS") located in the soil and communicably coupled to the control device for measuring soil moisture where the control device determines whether to irrigate the soil based on data from one or more of the TDRS's. The actuator can include a solenoid valve. The irrigation structure can be at least one of a surface irrigation structure, a sprinkler irrigation structure, and/or a subsurface drip irrigation structure.

In one embodiment, the at least one TDRS can include multiple TDRS's located in the soil. Each TDRS can be located at a different soil depth. The control irrigation system can include a data store for storing records of data from one or more of the TDRS'. The data store further can be communicably coupled any such TDRS's and the control device. The controlled irrigation system can also include a multiplexer communicably coupled to one or more of the TDRS's. Furthermore, the controlled irrigation system can include a data logger communicably coupled to at least one of the TDRS's and the control device for providing a communications interface between one or more of the TDRS's and the control device. The control device can be a computing device and one or more of the TDRS's can include probes where the probes are orientated substantially parallel to the surface of the soil.

The invention disclosed herein also provides a method for controlling an irrigation system including providing multiple TDRS's having probes, distributing each TDRS at a different soil depth, measuring soil moisture content, and irrigating soil based upon the measuring step. The method can also include orientating the probes of one or more of the TDRS's so that the probes are substantially parallel with a surface of the soil. The method further can include storing soil moisture content measurements.

In another embodiment, the method can include the step of producing a measure of representative soil moisture content from multiple TDRS measurements. The irrigating step can be based on the measure of representative soil moisture content. The method can also include setting soil moisture content threshold levels and comparing measurement values with the soil moisture content threshold levels. Additionally, the method can include irrigating based on a comparison of measurement values with the soil moisture content threshold levels and can include irrigating based on time.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a method and system for controlling the irrigation of soil. The present invention can determine whether to induce irrigation of the soil based on the soil moisture content. Thus, the system provides an automated irrigation response that does not rely on human intervention.

Figure 1A:
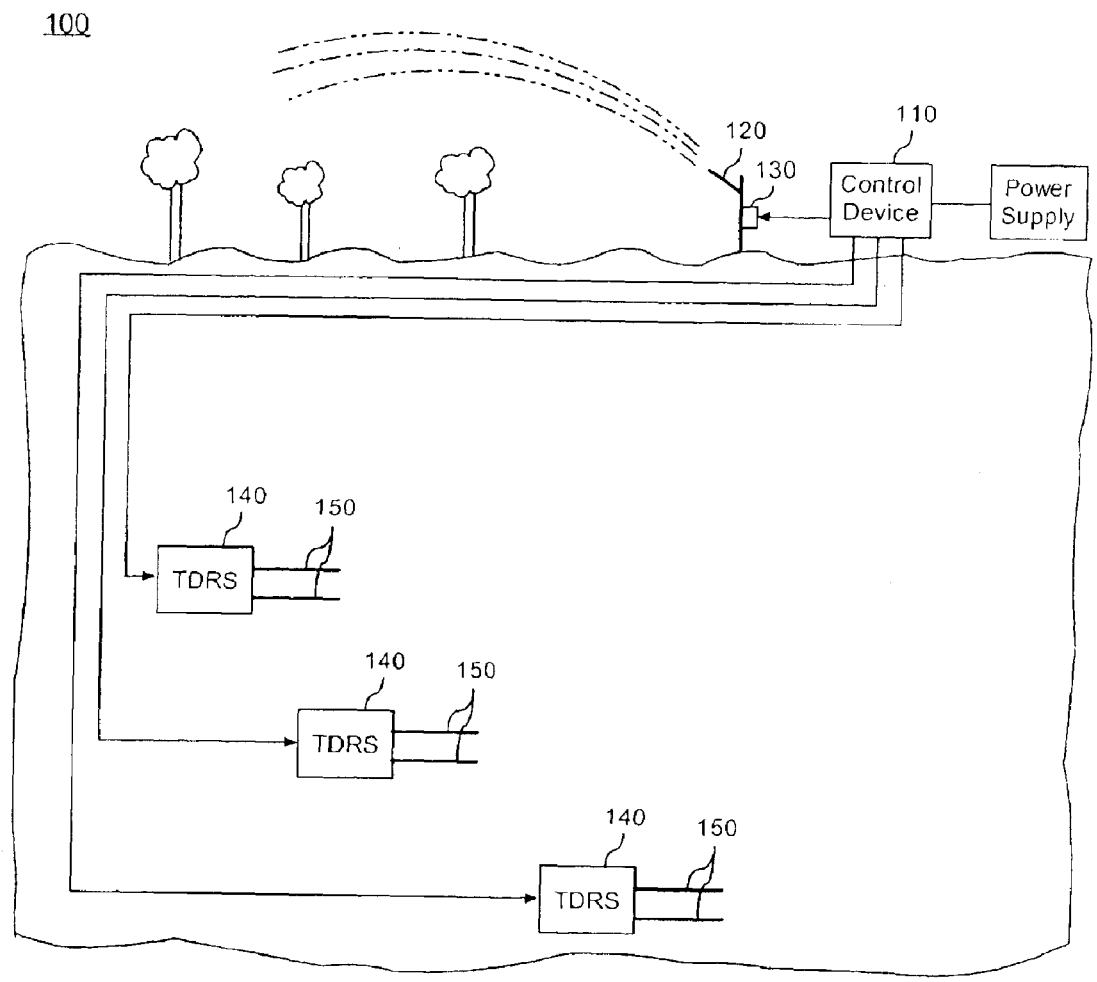
FIG. 1A is a schematic diagram illustrating a controlled irrigation system in accordance with the inventive arrangements disclosed herein.

FIG. 1A is a schematic diagram illustrating an exemplary controlled irrigation system 100. As shown, the irrigation system 100 can include a control device 110, an irrigation structure 120 with an actuator 130, and at least one time domain reflectometry sensor 140 ("TDRS").

The TDRS 140 can measure soil moisture which can serve as an indicator whether the soil should be irrigated, as determined by the control device 110. Measurements with TDRS 140 are beneficial as such measurements are nondestructive and offer excellent accuracy and precision. The TDRS 140 can include a plurality of probes 150 which can be used to measure the travel time of an electrical pulse or signal between the probes buried within the soil. The travel time of the electrical pulse between the probes can be used to detect soil moisture content.

In particular, the travel time of an electrical signal is directly related to the soil dielectric constant which is predominantly a function of free water content. Generally, water has a large dielectric constant relative to the dielectric constant of dry soil, which tends to be small in relation. This difference in the dielectric constants of damp or water filled soil as compared with dry soil enable the TDRS 140 to accurately measure soil moisture content. Notably, the TDRS 140 can be configured to detect changes in the quantity of soil moisture content as small as 0.006 $m^3m^{-3}$.

Still, the present invention is not limited by the particular variety of TDRS used or the tolerances of such a device. Further, the present invention can incorporate other types of soil moisture detection mechanisms if so desired. In any case, the TDRS's 140 can measure soil moisture and provide such measurements to the control device 110.

The control device 110 can determine whether to irrigate the soil based on data from one or more of the TDRS's 140. The control device 110 can be communicatively linked to the TDRS's 140 to receive digital signals indicating moisture content of the soil and can store the data in a data store (not shown) for later comparison or retrieval. Accordingly, the control device 110 can interpret the data specifying soil moisture measurements and can adjust the irrigation as may be required.

The control device 110 can be implemented as a computer system having appropriate operational software and memory or can be a proprietary controller having suitable logic circuitry, firmware, and/or application software. For example, the controller device 110 can be a general purpose computer system having a data capture card enabling the computer system to communicate with external devices such as the TDRS's 140 and the actuator 130.

According to one aspect of the present invention, the control device 110 can be programmed to start and stop irrigation at predetermined soil moisture content levels. When the TDRS's 140 take measurements indicating that the soil moisture content has declined lower than a predetermined level, the control device 110 can signal the actuator 130 of the irrigation structure 120 to begin delivering water. In contrast, when the TDRS's 140 take measurements indicating that the soil moisture content has risen above a predetermined level, the control device 110 can signal the actuator 130 of the irrigation structure 120 to stop delivering water.

The actuator 130, which is communicably coupled to the control device 110, can be a solenoid valve. The solenoid valve can be an electrical solenoid valve that can receive signals from the control device 110. Applying an electric current to the solenoid valve will generate a magnetic field that can pull a valve plunger causing the components of the valve to re-configure to an open position, and thereby, permit the flow of water. Thus, the control device can signal the actuator 130 to control the flow of water for the irrigation structure.

While solenoid valves typically have an "ON" and an "OFF" position, corresponding to a configuration allowing the free flow of water and a configuration that does not permit any water to flow through the valve, the invention is not limited in this regard. For example, it may be beneficial to utilize a solenoid valve capable of providing a limited flow of water so as to provide the soil with a constant and/or variable flow of water.

The irrigation structure 120 can be any suitable structure for delivering liquids to soils and soil systems, such as sprinkler irrigation structures, surface irrigation structures, subsurface drip irrigation structures, and the like. The irrigation structure 120 can include one or more individual water delivery mechanisms as may be required for delivering water to an agricultural area. Further, it should be appreciated that the system 100 can utilize a combination of water delivery systems such as sprinkler irrigation structures, surface irrigation structures, and/or subsurface drip irrigation structures.

In any case, FIG. 1A shows a sprinkler irrigation structure 120 that can deliver water to the soil. Advantages of such a sprinkler irrigation structure 120 include the ease of maintenance due the accessibility of the irrigation structure 120 and the actuator 130.

According to one embodiment of the present invention, the TDRS's 140, the control system 110 and the actuator 130 can be communicatively linked via a series of wired connections. Alternatively, wireless communications links can be used. For example, various components of the system 100 can be equipped with transceivers for permitting wireless communications. Still, a combination of both wired and wireless communications links can be used.

Figure 1B:
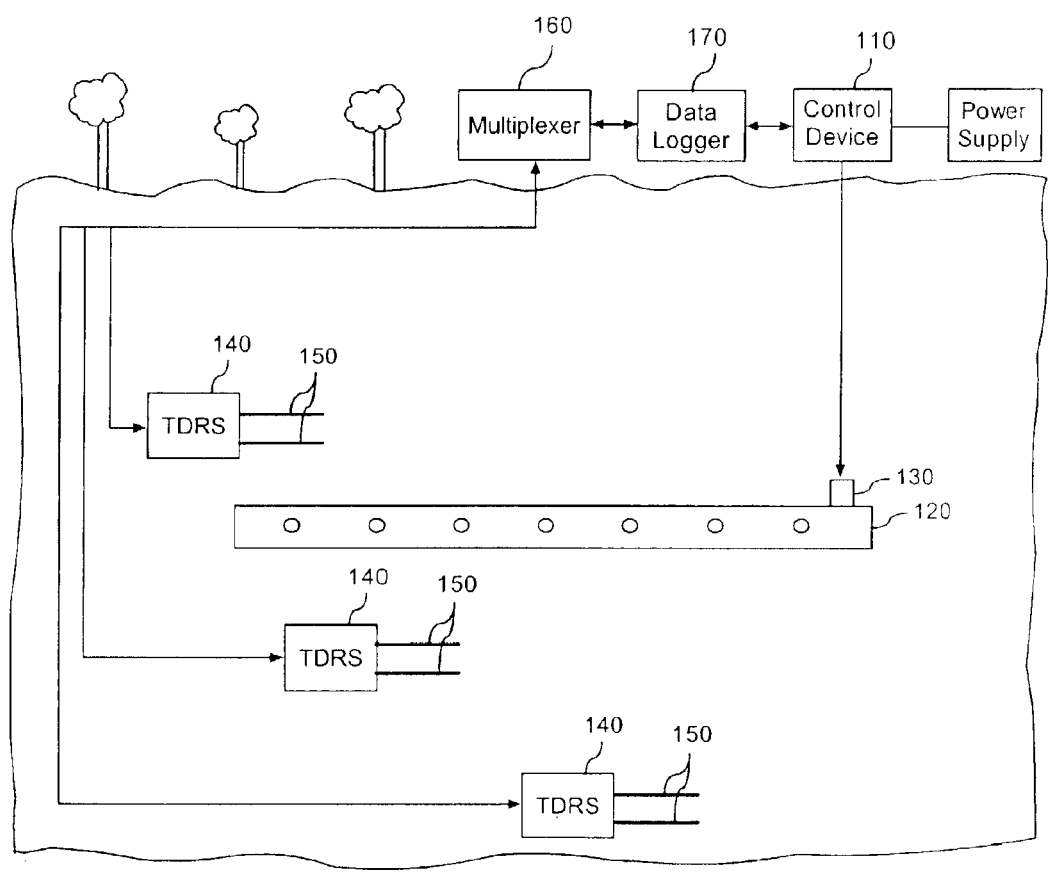
FIG. 1B is a schematic diagram illustrating another embodiment of a controlled irrigation system in accordance with the inventive arrangements disclosed herein.
Figure 2:
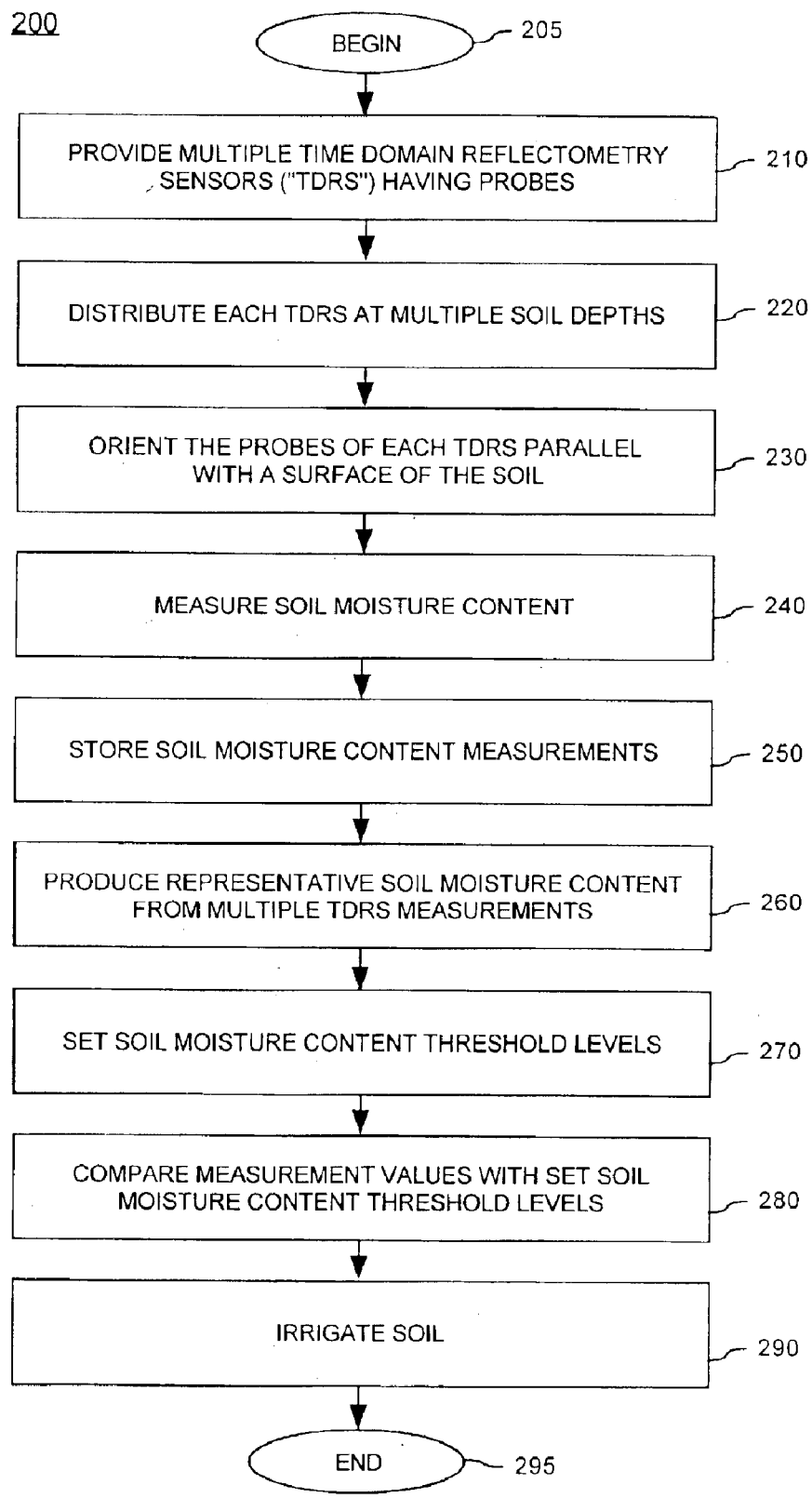
FIG. 2 is a flow chart illustrating a method for controlling an irrigation system in accordance with the inventive arrangements disclosed herein.

Turning to another embodiment illustrated in FIG. 1B, a subsurface irrigation structure 120 that can deliver water and nutrients contained within the water below the surface of the soil is shown. Such a subsurface irrigation structure 120 can be advantageous as it can deliver water and nutrients directly to the roots of plants. As shown in FIG. 1B, a multiplexer 160 and a data logger 170 can be communicably coupled to the control device 110. The multiplexer 160 and the data logger 170 can be used as a communications interface between each TDRS 140 and the control device 110.

The multiplexer 160 can be used with a plurality of TDRS's 140 for ensuring orderly communication between each TDRS 140 and the communications device 110. The multiplexer 160 can receive multiple signals of soil moisture content data from multiple TDRS's 140 at the same time. The multiplexer 160 can merge the signals from multiple TDRS's 140 into a single signal or data flow that can be transmitted to relay the data from each individual TDRS 140 to another device such as the data logger 170 and/or the control device 110. Notably, the present invention is not limited to a particular form of multiplexing or a particular communications protocol. For example, the present invention can utilize frequency-division multiplexing, time-division multiplexing (TDM), and/or dense wavelength division multiplexing (DWDM).

The multiplexer 160 can transmit the merged signal to the data logger 170. The data logger 170 can include a microprocessor (not shown) and a data store (not shown) and can be used to record measurements from the TDRS's 140. The data logger 170 further can time and date stamp received measurements. The data store on the data logger 170 can be accessed manually or can be accessed via the computing device 110. While the irrigation system 100 can properly function without data logger 170, data logger 170 can be advantageous in remote areas, particularly in vast agricultural fields.

As noted, the various components of the system 100 can communicate via wired and/or wireless communication links. For example, according to one embodiment of the present invention, the data logger 170 can communicate with a remote computing device to transmit measurements from each TDRS 140. Notably, according to another embodiment, rather than being in constant communication, the control device 110 can be configured to query the data logger 170 periodically or from time to time. Alternatively, the data logger 170 can be configured to transmit data periodically or from time to time.

While both FIGS. 1A and 1B illustrate one central power supply, it should be noted that the invention is not limited in this regard and that multiple power supplies can be used. Additionally, different forms of power supplies may be utilized. For example, solar power supplies can be used for above ground components and battery power supplies can be used for components disposed underneath the surface of the soil. If the TDRS's 140 are communicatively linked via a wired connection, these sensors can be powered by an above ground power source. Still, any suitable arrangement of power sources, whether centralized, individual, or various combinations thereof, can be used.

It should be appreciated also that the various components of the system 100 as disclosed herein can be located in various positions or combined into a single larger component. For example, the multiplexer 160 and the data logger 170 can be combined into a single larger or more complex unit. Further, the various components need not be co-located, but rather can be connected using networking technology such that the various components, or selected ones, are remotely located from one another.

A method for controlling an irrigation system is also provided in accordance with the inventive arrangements. Method 200 provides the ability to monitor and control an irrigation system such that the soil can achieve optimum soil moisture content while efficient irrigation can reduce waste from uncontrolled watering. Method 200 can begin at step 205. Multiple TDRS's having probes can be provided in step 210. As discussed earlier, the probes can be configured to detect soil moisture content and any suitable TDRS can be used.

In step 220, each TDRS can be distributed at a particular and/or different soil depth. The TDRS's can be located at any of a variety of different soil depths. For example, according to one embodiment, the TDRS's can be located at depths in and around the subsurface drip irrigation mechanism. Still, the TDRS's can be disposed at any suitable depth according to soil type and plant life located in the soil. The TDRS can be placed in the soil such that soil moisture contents can be measured from a variety of depths. For example, while one TDRS can be located relatively near the surface of the soil, another TDRS can be located relatively far beneath the surface of the soil. Such a distribution of TDRS can effectively detect an uneven distribution of water where regions of the soil at different depths can have varied soil moisture contents.

In step 230, each TDRS can be configured or oriented such that the probes of each TDRS can be orientated parallel or substantially parallel with the surface of the soil. A parallel orientation can provide advantages in accurately detecting soil moisture content. In some soils, water can accumulate near the probes of the TDRS and result in false readings; however, it has been found that a parallel orientation of the probes can reduce the tendency of water to collect near the probes and reduce false readings. Nevertheless, the invention is not limited in this regard, as the probes of each TDRS can be positioned in a variety of orientations. Additionally, the probes of each TDRS do not need to be uniformly orientated as it may be beneficial for the probes of one TDRS to have one orientation while the probes of another TDRS can have a different orientation.

Turning to step 240, the soil moisture content can be measured. As discussed above, each TDRS can include a plurality of probes that can be used to measure the travel time of an electrical pulse between the probes buried within the soil. The travel time of the electrical pulse between the probes can be used to detect soil moisture content. Additionally, it should be noted that method 200 can measure soil moisture content with any suitable measuring device.

The soil moisture content measurements can be stored in step 250. Along with storing the soil moisture content measurements, other relevant information can also be stored. A non-exhaustive list of other relevant information includes time of measurement, on which day the measurement was taken, and which TDRS took the measurement. Storing the soil moisture content measurement and related information can allow for analysis on the measurements and related information to be conducted at a later time to discover trends in water moisture content and even to detect malfunctioning equipment.

In step 260, a representative soil moisture content can be produced from multiple TDRS measurements. Because multiple TDRS's are distributed at different soil depths and can have multiple orientations, a multitude of unique measurements may be obtained from each TDRS. Additionally, water may be non-uniformly distributed throughout the soil causing some TDRS's to measure a relatively high soil moisture content while others measure a relatively low soil moisture content. For example, a TDRS located near the surface of the soil may measure a relatively low soil moisture content while a TDRS located deep beneath the soil may measure a relatively high soil moisture content.

While one TDRS measurement can be used as a measure of soil moisture content, multiple TDRS's can be used to determine a measure of average soil moisture that can be representative of overall soil moisture content. In one arrangement, each TDRS soil moisture content measurement can be averaged to produce a representative soil moisture content that is simply an average of all measurements. Nevertheless, the invention is not limited in this regard. For instance, some irrigation systems may function more efficiently when different regions of the soil have different soil moisture contents, such as an irrigation system for a particular type of plant with very deep roots that can only obtain water and nutrients at deep soil locations. Thus, such an irrigation system may benefit from relatively low soil moisture content measurements near the surface and relatively high soil moisture content measurements at deep soil. Thus, step 260 of producing a representative soil moisture content can uniquely weigh measurements from different TDRS's to more appropriately reflect the requirements of the soil and/or plant life located in the irrigated area.

Turning to step 270, soil moisture content threshold levels can be set. The soil moisture content level can include a start irrigation threshold and a stop irrigation threshold. Additionally, multiple threshold levels can also be set corresponding to different irrigation rates or volumes, such as a very slow irrigation or low volume, and a relatively fast irrigation or high volume. The soil moisture content threshold levels can be set at optimum levels, or at extreme ranges. For example, the start irrigation threshold level can be set at a soil moisture content level that is too low for the soil, while the stop irrigation threshold level can be set a soil moisture content level that is too high for the soil.

The soil moisture content measurement values can be compared with the soil moisture content threshold levels at step 280. The soil moisture content measurement values can be measurements from individual TDRS's, can be the representative soil moisture content produced in step 260, or can be a combination thereof. Comparing the soil moisture content measurement values can include a numerical comparison of whether the measurement value is greater than, lesser than, or equal to the soil moisture content threshold levels.

Accordingly, irrigation of the soil can be based on the soil moisture content measured by one TDRS, multiple TDRS's wherein each measurement from a particular TDRS is compared with corresponding or unique threshold for that sensor, and/or a measure of the representative soil moisture content as disclosed herein. The comparison of step 280 can be used to determine whether irrigation should be begun or ended. For example, the comparison can indicate whether the soil moisture content has risen or dropped outside of the acceptable set threshold levels. Accordingly, the irrigation can start and stop at the predetermined soil moisture content levels.

For instance, when the TDRS measurements (or the representative moisture content level) have fallen below the set threshold soil moisture content levels and indicate that the soil is too dry, the irrigation can start. Also, when the TDRS measurements (or the representative moisture content level) have risen above the set threshold soil moisture content levels and indicate that the soil contains too much moisture, the irrigation can stop. Still, as noted, a series of threshold levels can be set wherein the water flow is variably controlled rather than turned on or off.

In step 290, the soil can be irrigated based on the soil moisture content. Irrigating the soil can include both starting irrigation and stopping irrigation. Additionally, levels of irrigation can be employed ranging from light irrigation to heavy irrigation, respectively corresponding to delivering a relatively low volume of water and to delivering a relatively high volume of water. Thus, based on the soil moisture content, the method 200 can automatically provide the appropriate irrigation without human intervention. The method 200 can end at step 295 or can begin again at step 205 to repeat as may be required.

While the method 200 discloses one embodiment of the present invention, others are contemplated as well. For example, although irrigation can be based on soil moisture content, method 200 can include the step of irrigating based on time. A non-exhaustive list of relevant "times" can include the time of day, the time of year, the time related to the duration of irrigation, the time related to the duration since stopping the previous irrigation, and any combination thereof. In one example, some soils may need to be irrigated for a particular amount of time to ensure uniform water distribution in the soil, regardless of the soil moisture content measurements. In another example, although moisture content measurements may indicate that the soil should be irrigated, due to a lack of moisture, irrigation may not be possible or legal during particular times, such as during the winter or in a jurisdiction with time-of-day water restrictions. Thus, time-based irrigation can be beneficial. Accordingly, the control device can be programmed with operational rules allowing time restriction rules to effectively override soil moisture content irrigation rules.

Also, the present invention can include one or more flow meters allowing the amount of water delivered to a particular region to be measured. Accordingly, the control device can be configured to include rules governing the delivery of water according to the amount of water actually delivered to the soil.

It should be appreciated that not only can one or more sensors be placed at various depths, but the sensors can be arranged in specific areas of a larger region. Each sensor grouping can be linked with a different control device and water delivery mechanism such that each area of a larger region can be irrigated independently of the other areas. Alternatively, a single control device can be used which is capable of classifying or tracking multiple groupings of moisture sensors so that each grouping can be processed independently of the other groupings.

This invention can be embodied in other forms without departing from the spirit or essential attributes thereof. Accordingly, reference should be made to the following claims, rather than to the foregoing specification, as indicating the scope of the invention.

What is claimed is:

1. A method for controlling an irrigation system, comprising the steps of:
   providing multiple independent time domain reflectometry sensors ("TDRS") having probes;
   distributing each TDRS at a different soil depth separate from another TDRS;
   measuring soil moisture content; and
   irrigating soil based upon said measuring step.

2. The method according to claim 1, further comprising the step of orientating the probes of at least one of the TDRS's so that the probes are substantially parallel with a surface of the soil.

3. The method according to claim 1, further comprising the step of storing soil moisture content measurements.

4. The method according to claim 1, further comprising the step of producing a measure of representative soil moisture content from multiple TDRS measurements.

5. The method according to claim 4, wherein said irrigating step is based on the measure of representative soil moisture content.

6. The method according to claim 1, further comprising the step of setting soil moisture content threshold levels.

7. The method according to claim 6, further comprising the step of comparing measurement values with the soil moisture content threshold levels.

8. The method according to claim 7, wherein said irrigating step is based on a comparison of measurement values with the soil moisture content threshold levels.

9. The method according to claim 1, wherein said irrigating step is further based on time.

10. A controlled irrigation system comprising:
    a control device for determining whether to irrigate soil;
    at least one irrigation structure having an actuator for controlling water flow, said actuator being communicably coupled to said control device for delivering water to irrigate a region;
    at least two time domain reflectometry sensors ("TDRS") located separately in the soil, each TDRS independently and communicably coupled to said control device for providing independent soil moisture measurements; and wherein said control device determines whether to irrigate the soil based on data from said at least one TDRS.

11. The controlled irrigation system according to claim 10, wherein said actuator includes a solenoid valve.

12. The controlled irrigation system according to claim 10, wherein said at least one irrigation structure is at least one of a surface irrigation structure, a sprinkler irrigation structure, and a subsurface drip irrigation structure.

13. The controlled irrigation system according to claim 10, wherein said at least two TDRS's include a plurality of TDRS's located in the soil.

14. The controlled irrigation system according to claim 13, wherein each said TDRS is located at a different soil depth.

15. The controlled irrigation system according to claim 10, further comprising a data store for storing records of data from said TDRS, wherein said data store is communicably coupled to said TDRS and said control device.

16. The controlled irrigation system according to claim 10, further comprising a multiplexer communicably coupled to said TDRS.

17. The controlled irrigation system according to claim 10, further comprising a data logger communicably coupled to said TDRS and said control device for providing a communications interface between said TDRS and said control device.

18. The controlled irrigation system according to claim 10, wherein said control device is a computing device.

19. The controlled irrigation system according to claim 10, wherein said TDRS includes probes, wherein said probes are orientated substantially parallel to the surface of the soil.

20. The controlled irrigation system according to claim 10, wherein each TDRS communicates based on a protocol that provides unique identification of at least the individual TDRS and the measurement taken by the individual TDRS, such that the control device can determine whether to irrigate based on unique measurements taken from separate and independent TDRS's.

* * * * *